US011305716B2

(12) United States Patent
Hirota et al.

(10) Patent No.: US 11,305,716 B2
(45) Date of Patent: Apr. 19, 2022

(54) STEERING WHEEL

(71) Applicant: Autoliv Development AB, Vargarda (SE)

(72) Inventors: Yutaka Hirota, Kanagawa (JP); Sumit Kumar, Kanagawa (JP); Kazuhiro Abe, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 1 day.

(21) Appl. No.: 16/960,632

(22) PCT Filed: Jan. 2, 2019

(86) PCT No.: PCT/JP2019/000003
§ 371 (c)(1),
(2) Date: Jul. 8, 2020

(87) PCT Pub. No.: WO2019/142654
PCT Pub. Date: Jul. 25, 2019

(65) Prior Publication Data
US 2020/0346606 A1 Nov. 5, 2020

(30) Foreign Application Priority Data
Jan. 19, 2018 (JP) .............................. JP2018-007708

(51) Int. Cl.
*B60R 21/203* (2006.01)
*B60R 21/2165* (2011.01)
*B60R 21/217* (2011.01)

(52) U.S. Cl.
CPC .... *B60R 21/2037* (2013.01); *B60R 21/21656* (2013.01); *B60R 21/2032* (2013.01); *B60R 21/217* (2013.01); *B60Y 2304/07* (2013.01)

(58) Field of Classification Search
CPC ............ B60R 21/2032; B60R 21/2035; B60R 21/2037; B60R 21/21656
See application file for complete search history.

(56) References Cited

U.S. PATENT DOCUMENTS 5,772,191 A    6/1998  Nakano et al.
5,931,492 A *  8/1999  Mueller ................. B60Q 5/003
                                                    280/728.2
(Continued)

FOREIGN PATENT DOCUMENTS

JP    H05-126189 A    5/1993
JP    2001-180419 A   7/2001
(Continued)

OTHER PUBLICATIONS

International Search Report of the International Searching Authority for PCT/JP2019/000003 dated Mar. 5, 2019.
(Continued)

*Primary Examiner* — Barry Gooden, Jr.
(74) *Attorney, Agent, or Firm* — Stoel Rives LLP

(57) ABSTRACT

[Problem] To enable an airbag module to be assuredly assembled to a cored bar.
[Resolution Means] The present invention is applied to a steering wheel including: a cored bar member; and an airbag module which houses an airbag cushion and an inflator and is coupled to the cored bar member via a coupling pin, wherein the steering wheel employs a configuration in which the coupling pin extends from the airbag module side to the cored bar member side. The steering wheel according to the present invention includes: a coil spring arranged outside the coupling pin; and a support member supporting the upper end of the coil spring at a peripheral part of the coupling pin. Moreover, the support member includes a hook which includes: a support surface protruding in the direction vertical to the shaft of the coupling pin in order to support the
(Continued)

upper end part of the coil spring; and a side extending from this support surface towards the lower side of the coupling pin. In addition, the coil spring is configured so as not to interfere with the side of the hook.

9 Claims, 17 Drawing Sheets

(56) References Cited

U.S. PATENT DOCUMENTS

| | | | |
|---|---|---|---|
| 8,459,686 B2 | 6/2013 | Suzuki et al. | |
| 8,985,623 B2* | 3/2015 | Kondo | F16F 7/1028 |
| | | | 280/731 |
| RE47,687 E * | 11/2019 | Umemura | B60R 21/2037 |
| 2001/0054810 A1* | 12/2001 | Sakane | B60R 21/2037 |
| | | | 280/728.2 |
| 2010/0066062 A1 | 3/2010 | Suzuki et al. | |
| 2010/0219621 A1* | 9/2010 | Sasaki | B60Q 5/003 |
| | | | 280/731 |
| 2011/0120258 A1* | 5/2011 | Kondo | B60Q 5/003 |
| | | | 74/552 |
| 2013/0026741 A1* | 1/2013 | Onohara | B60R 21/2037 |
| | | | 280/731 |
| 2013/0076011 A1* | 3/2013 | Umemura | B60Q 5/003 |
| | | | 280/728.2 |
| 2013/0239739 A1* | 9/2013 | Miyahara | B60R 21/2037 |
| | | | 74/552 |
| 2015/0210308 A1* | 7/2015 | Onohara | B60Q 5/003 |
| | | | 200/61.54 |
| 2016/0114752 A1* | 4/2016 | Banno | B60R 21/2165 |
| | | | 280/728.2 |
| 2017/0152907 A1 | 6/2017 | Kato et al. | |
| 2020/0346605 A1* | 11/2020 | Hirota | B62D 7/222 |
| 2021/0269080 A1* | 9/2021 | Kim | B62D 1/10 |

FOREIGN PATENT DOCUMENTS

| | | |
|---|---|---|
| JP | 2010-69934 A | 4/2010 |
| JP | 2017-159696 A | 9/2017 |
| WO | 2015/194192 A1 | 12/2015 |
| WO | 2016/158503 A1 | 10/2016 |

OTHER PUBLICATIONS

English translation of International Search Report of the International Searching Authority for PCT/JP2019/000003 dated Mar. 5, 2019.

* cited by examiner (a)

(b)

STEERING WHEEL

TECHNICAL FIELD

The present invention relates to a steering wheel of an automobile and specifically relates to a steering wheel configuration including a so-called floating airbag module.

BACKGROUND

In many cases, recent vehicles include a front airbag apparatus provided in the middle on the passenger side of the steering wheel. The front airbag is deployed by expansion gas in order to protect passengers from a collision in the forward direction. The front airbag is housed in a housing together with an inflator for supplying gas and attached to the steering wheel as an integral airbag module. Such an airbag module is held while floating from a cored bar of the steering wheel (floating configuration), moved in the cored bar direction (when a passenger pushes the airbag module when operating the horn), and utilized as a horn switch (for example, Patent Document 1).

The airbag module of Patent Document 1 employs a snap fit configuration, allowing it to be simply attached to a cored bar member serving as the base of the steering wheel. The snap fit configuration is generally a configuration for bonding (coupling) utilizing the elasticity of members. In addition, only when a pin provided in the airbag module is inserted into the cored bar member, can it be coupled to a clip (rod-shaped spring) at the back of the cored bar member and attached thereto.

A coil spring is provided outside the pin attached to the bottom of the airbag module so as to bias the airbag module upward (passenger side) without operating the horn. In addition, upon operating the horn, the airbag module is pushed against the repulsion of the coil spring. Note that a groove is formed at the tip of the pin and is hooked by the abovementioned clip and coupled thereto.

Incidentally, in the airbag module such as that described in Patent Document 1, the coil spring may tilt for some reason. If the coil spring tilts, it becomes difficult for the pin inserted therein to be assuredly coupled to a cored bar. For example, if the lower end part of the coil spring enters the groove of the pin tip, the airbag module cannot be attached.

RELATED ART DOCUMENTS

Patent Documents

Patent Document 1: Japanese Unexamined Patent Application Publication No. 2010-69934

DISCLOSURE OF THE INVENTION

Problem to be Solved by the Invention

The present invention has been created in view of the abovementioned problems, with an object of providing a steering wheel which enables an airbag module to be assuredly assembled to a cored bar.

Means for Solving the Problem

The present invention includes: a cored bar member; and an airbag module which houses an airbag cushion and an inflator and is coupled to the cored bar member via a coupling pin. The steering wheel employs a configuration in which the coupling pin extends from the airbag module side to the cored bar member side. The steering wheel according to the present invention includes: a coil spring arranged outside the coupling pin; and a support member supporting the upper end of the coil spring at a peripheral part of the coupling. Moreover, the support member includes a hook which includes: a support surface protruding in the direction vertical to the shaft of the coupling pin in order to support the upper end part of the coil spring; and a side extending from this support surface towards the lower side of the coupling pin. In addition, the coil spring is configured so as not to interfere with the side of the hook.

The configuration as described above allows the coil spring to be prevented from interfering with the hook of a damper unit and tilting to the pin.

The hook is provided at four positions at equal intervals in a plane perpendicular to the axial direction of the pin. At this time, within a predetermined range from the upper tip, the coil spring is preferably molded so as to have a constant curvature radius $r1$ which is smaller than the radius $r0$ of the circle connecting the outermost edges of the hooks, in addition to being supported on the support surface of each of the hooks within at least this range; and the curvature radius gradually increases at the part exceeding the predetermined range, while, at the point of reaching 360 degrees, the coil spring preferably has a curvature radius $r2$ which is larger than the radius $r0$ of the circle connecting the outermost edges of the hooks. Note that the predetermined range can be an angle range of 180 degrees.

Moreover, the coil spring can be molded into a cylindrical shape so as to have a constant curvature radius $r2$ after the second winding from the upper end. Alternatively, it can be molded into a conical shape as the curvature radius gradually increases after the second winding from the upper end.

The side of the hook can be tilted towards the center side of the support member as it moves to the lower side of the pin.

A slit extending in the axial direction is preferably formed in the vicinity of the hook in the support member. For example, the slit can be formed at both ends of the hook in the circumferential direction of the support member.

The presence of such a slit causes the hook part to bend inward when the coil spring is mounted to the support member, thereby facilitating the upper end of the coil spring and allowing it to ride over the side of the hook to reach the support surface. Further, by reducing the curvature diameter of the upper end of the coil spring disposed above the hook support surface, it becomes possible to adhere the coil spring to the body part of the support member.

Note that in the present invention, regarding the number of hooks, it is essential that the diameter (radius of curvature) of the coil spring, etc. should be such that, when the coil spring is rotated about the pin serving as the shaft, the coil spring is stably supported at any angle without falling off, and the coil spring does not interfere with the hook or tilt. In addition, the design can be changed as appropriate within the scope of the concept.

DESCRIPTION OF THE PREFERRED EMBODIMENT

Examples according to the present invention will hereinafter be described in detail with reference to the appended drawings. Note that in the present specification and drawings, elements having substantially identical functions and configurations are labeled with identical symbols in order to omit redundant descriptions along with the illustration of elements not directly related to the present invention.

In the examples presented below, while an airbag module with a damper unit is employed as an example, the damper unit itself is not necessarily required in the present invention. That is, the present invention is applicable to configurations in which a coil spring is arranged outside a coupling pin and which does not use a damper.

In the following description and drawings, the rotation axis of the steering column is the Z axis, while the surface vertical to this Z axis is the XY plane. Note that the XY plane is often the plane parallel to a rim part. The "rotation direction" denotes the direction in which the rim part (gripping part) rotates about the boss center in the XY plane.

Figure 1:
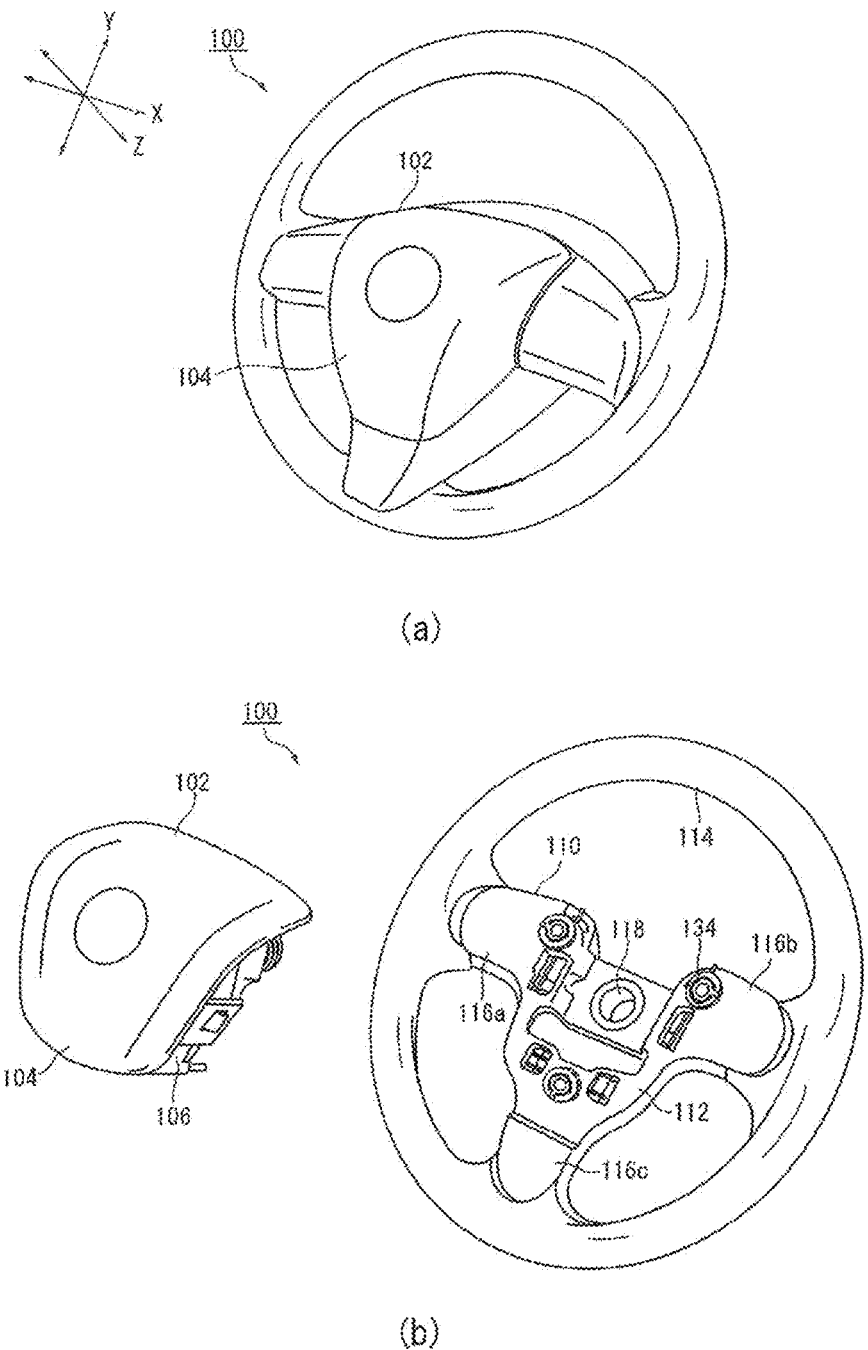
FIG. 1 is a perspective view schematically illustrating a steering wheel apparatus applicable to the present invention, wherein (a) illustrates the appearance as equipped with an airbag module, while (b) illustrates the state prior to assembling the airbag module.

FIG. 1 is a view schematically illustrating a steering wheel apparatus (steering wheel 100) according to an example of the present invention. FIG. 1(a) illustrates the overall steering wheel 100. Incidentally, in the following drawings including FIG. 1(a), each direction is illustrated under the assumption that the steering position of the steering wheel 100 attached to the vehicle is in a neutral position. For example, the Z axis is set to have the downward side in the front wheel direction of the vehicle on a steering column (steering shaft) (not illustrated) and the upward side in the direction toward the steering wheel 100. In addition, in a plane orthogonal to the Z axis, the X axis is set from the 9 o'clock direction (left direction) toward the 3 o'clock direction (right direction), while the Y axis is set from the 6 o'clock direction (rear direction) toward the 12 o'clock direction (forward direction), with the 12 o'clock position of an analog 12-hour clock as the front side of the vehicle. Alternatively, the side viewed from the side of a passenger is referred to as the front side, with the opposite side thereof referred to as the back side.

The steering wheel 100 is installed at the driver seat of a vehicle so as to be connected to the steering shaft that penetrates inside the steering column (not illustrated) and transmits the operation force of the driver to a steering gear or the like. An airbag module 102 that functions as a front airbag in an emergency is attached at the center of the steering wheel 100. This airbag module 102 also functions as a horn switch that a passenger pushes to ring a horn in normal times.

FIG. 1(b) is an exploded view of the steering wheel apparatus 100 in FIG. 1(a). As illustrated in FIG. 1(b), the airbag module 102 at the side of the passenger is covered with a resin cover 104 which functions as a design surface. A box-shaped housing 106 is provided below a cover 104, such that an airbag cushion (not illustrated) is folded and housed thereinside so as to be expanded and deployed in the event of an emergency. An inflator 108 (see FIG. 2), which is a gas generator, is also provided within the housing 106. When a signal is transmitted from the sensor of a vehicle in an emergency, gas is supplied from the inflator 108 to the airbag cushion, causing the airbag cushion to tear open the cover to expand and be deployed in the vehicle interior space, thereby restraining the passenger.

A base part of the steering wheel 100 is configured of a metal cored bar member 110. The cored bar member 110 is largely configured to include a central boss region 112, a circular rim 114 that a passenger grips, and spokes 116a to 116c that connect the boss region 112 and the rim 114. A shaft hole 118 coupled to a steering shaft is provided in the boss region 112.

The airbag module 102 of the present example functions as a horn switch as described above and further as a module damper mechanism that dampens vibrations, in addition to functioning as a front airbag. Configurational elements that realize the function as a horn switch and module damper mechanism will be described below in detail.

Figure 2:
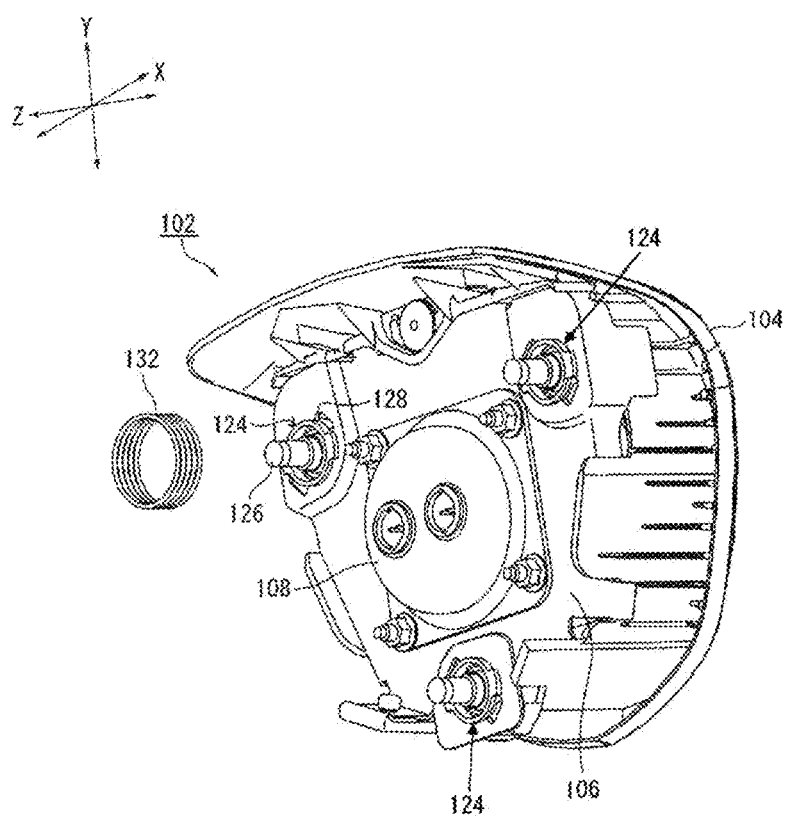
FIG. 2 is a perspective view observed from the back side of the airbag module illustrated in FIG. 1(b).

FIG. 2 is a view illustrating the back of the airbag module 102 in FIG. 1(b). As illustrated in FIG. 2, multiple damper units 124 are provided on the rear surface 120 of the housing 106. The damper unit 124 is a member that elastically attaches the housing 106 to the cored bar member 110 (see FIG. 1(b)) and is central to the module damper mechanism. In the present example, the damper unit 124 is provided at a total of three positions, consisting of: both end sides in the X axis direction at the back of the housing 106; and the rear side thereof in the Y axis direction.

Note that the number and arrangement of the damper units 124 are only one example, and the number and arrangement may be freely defined in an arrangement symmetric to the Y axis. For example, each damper unit 124 may be symmetrically arranged in the Y axis (or the X axis). Moreover, for example, at the center of the airbag module 102 in the X axis direction, the damper unit 124 may be arranged at two positions in total, at the upper and lower parts in the Y axis direction. In addition, each damper unit 124 may be geometrically and unsymmetrically arranged taking into consideration the balance of performance requirements (damping performance and horn switch performance) of all arranged damper units.

The rod-shaped pin 126 protrudes from the damper unit 124 towards the boss region 112 (see FIG. 1(b)) of the cored bar member 110 disposed below in the Z-axis direction. This pin 126 is inserted into a bearing hole 128 via a collar member 134 (see FIG. 3) of the cored bar member 110 and coupled to the below-mentioned rod-shaped spring 130 installed at the back side of the cored bar member 110. The coupling between this pin 126 and the spring 130 attaches the airbag module 102 to a cored bar member 110.

Figure 3:
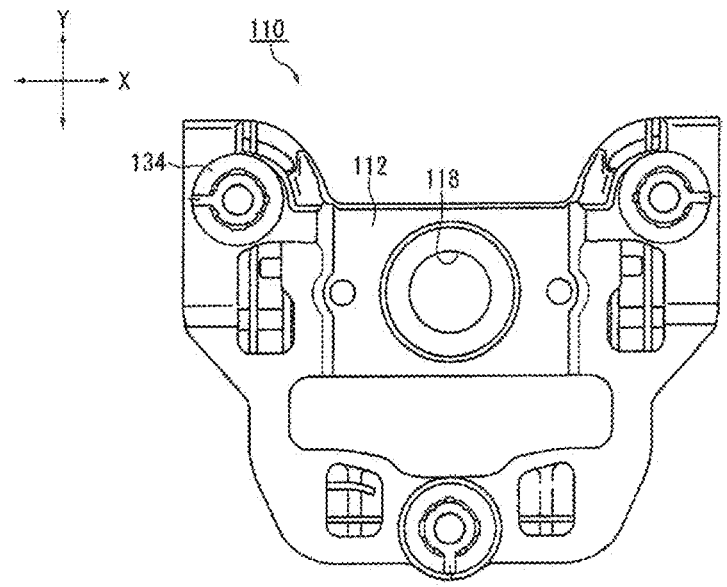
FIG. 3 is a plan view illustrating a portion (boss region) of a cored bar member of the steering wheel, wherein (a) is the state when viewed from the front side (airbag module side, passenger side), while (b) is the state when viewed from the back side (steering column side).
Figure 3:
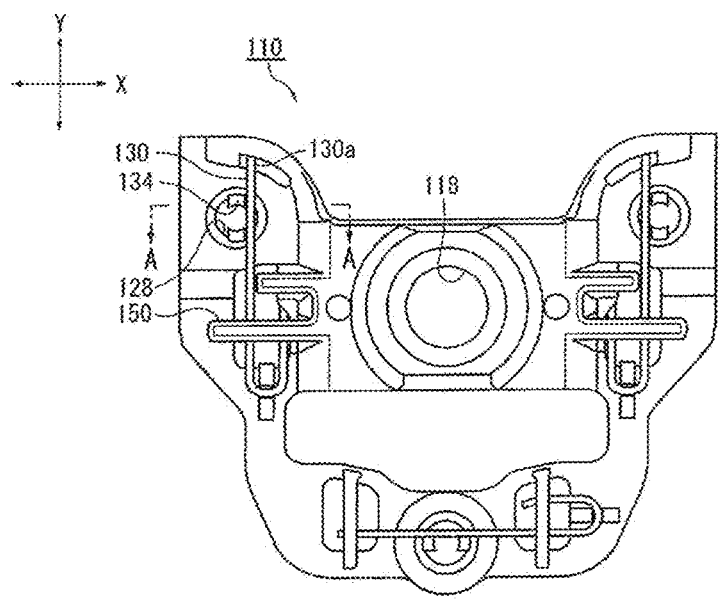

FIG. 3 is a view illustrating the boss region 112 of the core mold member 110 in FIG. 1(b). FIG. 3(a) is a view illustrating the state in which the core metal member 110 is viewed from the airbag module 102 side, while FIG. 3(b) illustrates the back side of the core mold member 110 in FIG. 4(a). As illustrated in FIG. 3(a), three collar members 134 into which the pins 126 of the damper units 124 are inserted are provided in the core metal member 110. Each of these collar members 134 is attached to each bearing hole into which the pin 126 (see FIG. 2) is inserted.

In the present embodiment, as illustrated in FIG. 3(b), a rod-shaped spring (omega spring) 130 is provided below each bearing hole. The rod-shaped spring 130 is a spring element which supports the pin 126. The rod-shaped spring 130 has the bent shape of an elongated metal rod. The rod-shaped spring 130 is supported and installed with a rib 150, etc., but one end thereof is a free end 130a with no support which may potentially warp. When the pin 126 engages with the free end 130a of this rod-shaped spring 130, the airbag module 102 is detachably attached to the cored bar member.

The pin 126 is inserted into the core metal member 110 through a first spring 132 and the collar member 134 (see FIG. 1(b)). The first spring 132 is coil shaped, functioning as a so-called horn spring, and is installed between the airbag module 102 and the cored bar member 110 so as to ensure a gap therebetween. Hence, the airbag module 102 released from being pushed down by a passenger during a horn operation is separated from the cored bar member 110 to return to the original position thereof.

Figure 4:
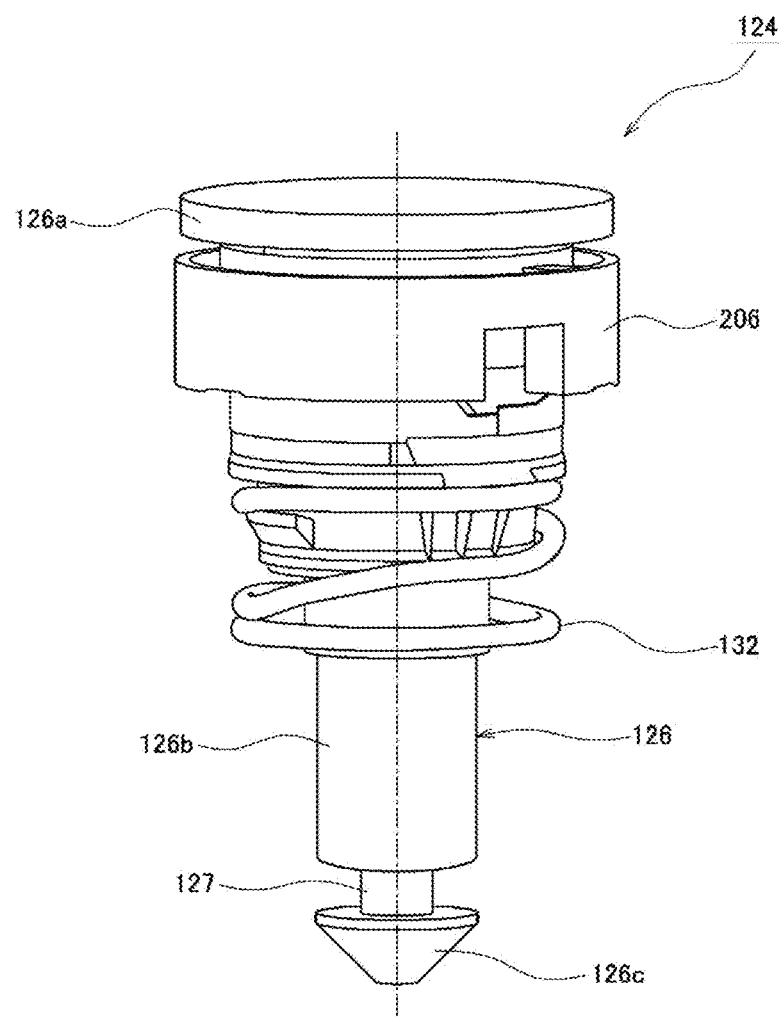
FIG. 4 is a perspective view illustrating a damper unit used in an airbag apparatus according to the present invention.
Figure 5:
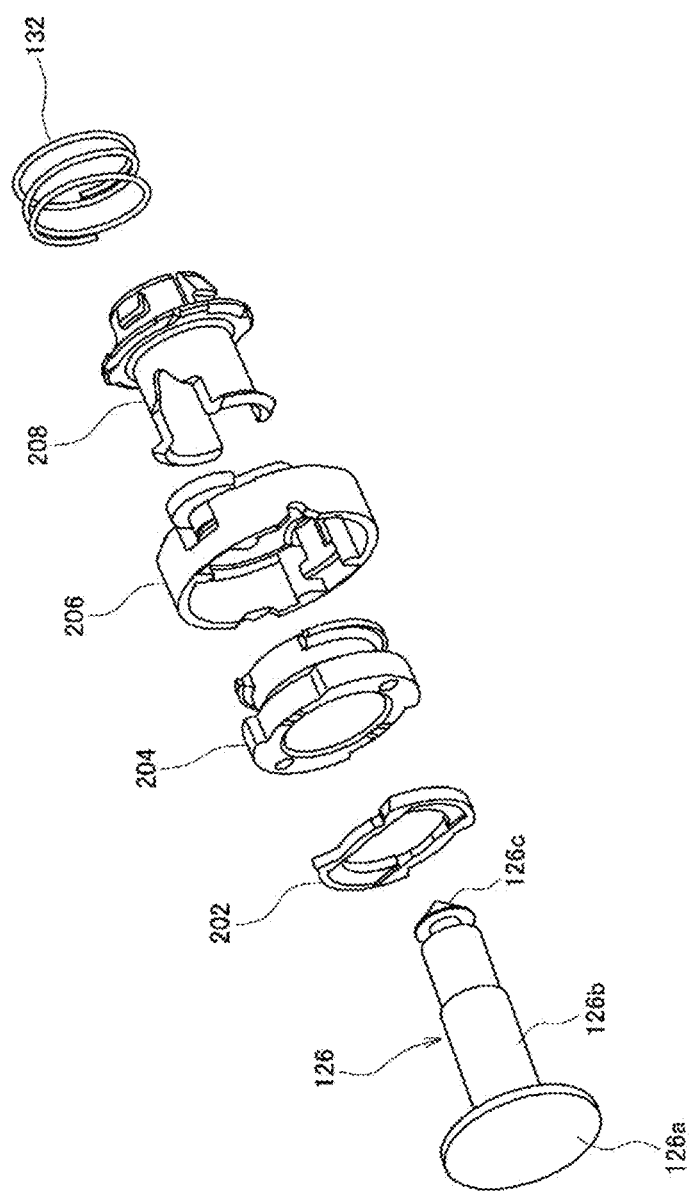
FIG. 5 is an exploded perspective view of the damper unit illustrated in FIG. 4.

FIG. 4 is a perspective view illustrating the damper unit 124 used in the airbag apparatus according to the present invention. FIG. 5 is an exploded perspective view of the damper unit 124 illustrated in FIG. 4. In addition to the abovementioned damper pin 126, the damper unit 124 includes: a rubber holder plate 202; a rubber member 204 having elastic force; a rubber holder 206 holding the rubber member 204; and a support member 208 which is molded of an insulating material so as to hold the upper end of the coil spring 132.

These components 202, 204, 206, 208 are concentrically arranged with the damper pin 126. The damper pin 126 includes a disc-shaped upper end 126a, a cylindrical main body part 126b, and a tip part 126c in which a groove 127 is formed on the periphery thereof.

Figure 6A:
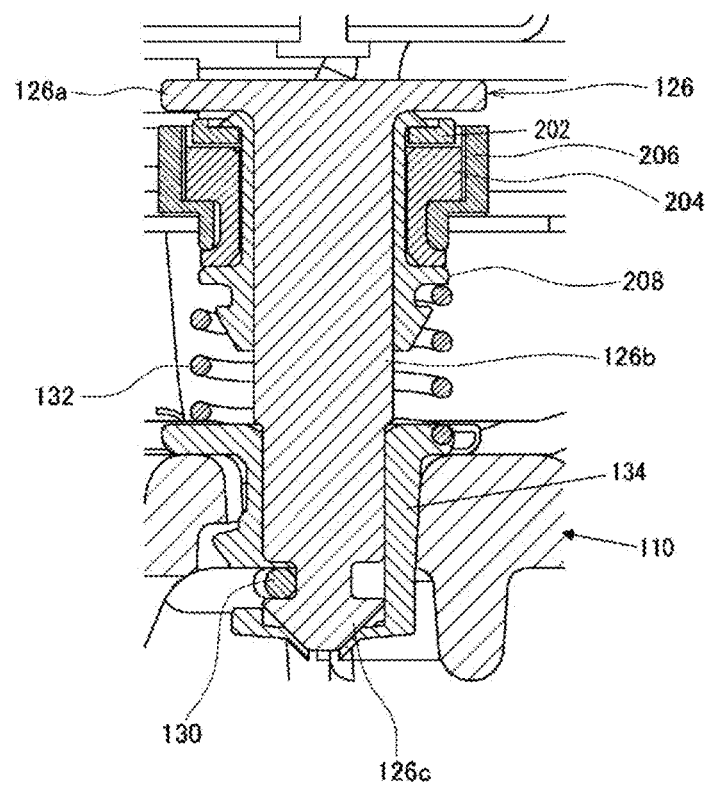
FIG. 6A is a cross sectional view illustrating the state in which the damper unit illustrated in FIGS. 4 and 5 is inserted into a bearing hole of the cored bar member.
Figure 6B:
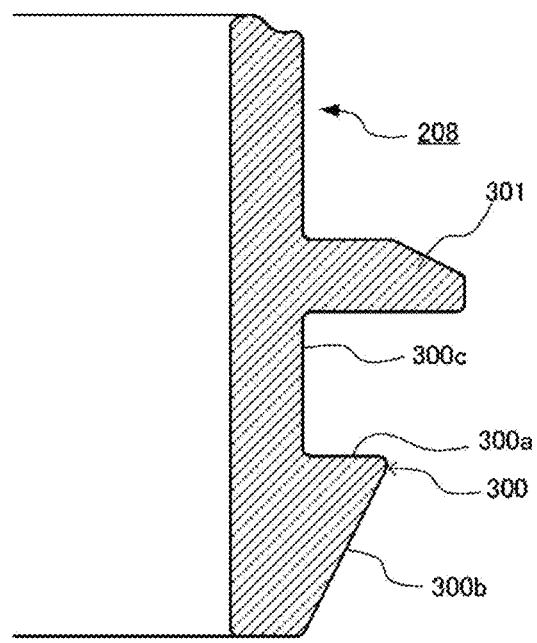
FIG. 6B is an enlarged cross sectional view of a portion of FIG. 6A.

The damper unit 124 and the peripheral configuration thereof described above will hereinafter be described in further detail with reference to FIGS. 6A, 6B. FIG. 6A is a view corresponding to the A-A cross section in the bearing hole 128 of the cored bar member 110 in FIG. 3(b). This FIG. 6A illustrates the cross section including the X axis and the Y axis in the damper unit 124 coupled to the cored bar member 110. FIG. 6B is an enlarged cross sectional view of a portion of FIG. 6A.

As illustrated in FIG. 6A, when the pin 126 of the damper unit 124 is coupled to the rod-shaped spring 130 on the cored bar member 110 side, the airbag module 102 is attached to the cored bar member 110. At this time, the pin 126 passes inside the coil spring 132, with this coil spring 132 arranged between the airbag module 102 and the cored bar member 110. The airbag module 102 is supported by the coil spring 132, thereby allowing it to function as a horn switch.

The collar member 134 supports the side of the pin 126 inside the bearing hole 128. Because the collar member 134 is installed, the pin 126 can be supported at a higher position than the case of the cored bar member 110 alone, making it possible to further enhance the uprightness of the pin 126.

In the abovementioned configuration, when the airbag module 102 is attached to the cored bar member 110, in a simple snap fit only involving inserting the pin 126 into the cored bar member 110, the airbag module 102 is attached to the cored bar member 110 so as to function as the horn switch.

As mentioned above, the steering wheel 100 in the present example, the damper unit 124 exerts multiple functions as a contact point when the horn is operated, as well as an element (vibration damping) elastically supporting the airbag module 102 in a vibration damping mechanism. Consequently, another member does not have to be provided in each function, enabling a simplified configuration.

In the present example, the airbag module 102 attached to the cored bar member 110 by a snap fit configuration can also be removed from the cored bar member 110 via a relatively simple operation. If the airbag module 102 is removed, the rod-shaped spring 130 is warped from the back of the cored bar member 110 using a predetermined tool so as to decouple the pin 126 and the rod-shaped spring 130. At this time, a configuration facilitating the operation is provided in the cored bar member 110 according to the present example.

As illustrated in particular detail in FIG. 6B, the coil spring 132 is configured such that the upper end thereof is supported by a support member 208. The support member 208 includes a hook 300 which is provided at four positions at equal intervals within the face vertical to the axial direction of the damper pin 126 in order to support the upper end part of the coil spring 132. Four hooks 300 are formed at the lower end of a side wall 302 below the support member 208. A flange 301 is formed above each hook 300.

Each hook 300 includes: a support surface 300a protruding in the direction vertical to the axial direction of the damper pin 126; and a side 300b extending from this support surface 300a towards the lower side of the damper pin 126. In addition, the upper end part of the coil spring 132 (a portion of the first winding) is supported on the support surface 300a so as not to fall off after mounting. As the side 300b of the hook 300 moves to the lower side of the damper pin 126, the cross section tilting towards the center side of the support member 28 is molded into a wedge shape.

Figure 7:
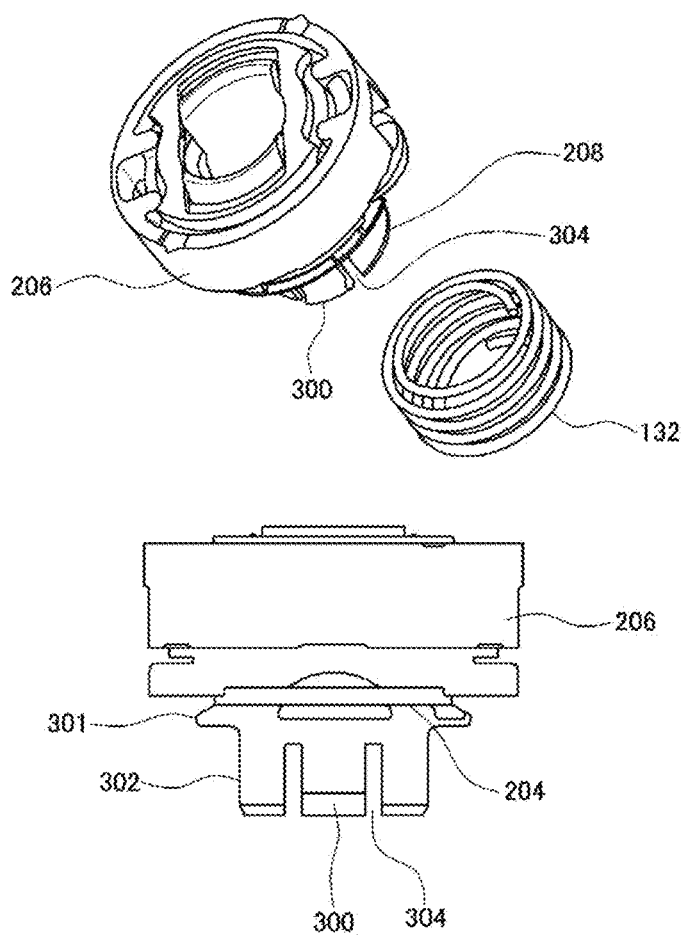
FIG. 7 is a perspective view (a) and a side view (b) illustrating the configuration of a portion of the damper unit illustrated in FIGS. 4 and 5.
Figure 8:
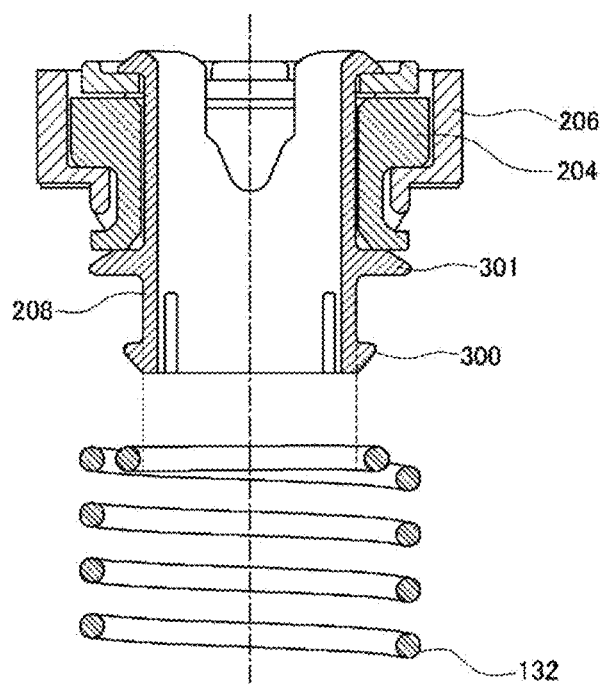
FIG. 8 is a longitudinal cross sectional view of a portion of the damper unit illustrated in FIG. 7(b).
Figure 9:
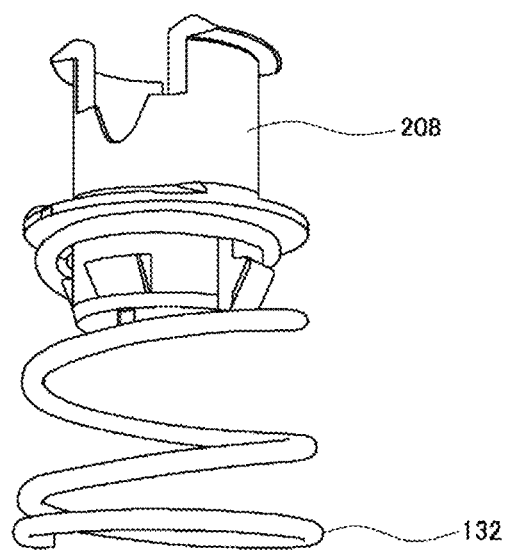
FIG. 9 is a perspective view illustrating the state in which a coil spring is mounted on the damper unit.

FIG. 7 is a perspective view (a) and a side view (b) illustrating a portion of the damper unit 124 illustrated in FIGS. 4 to 6A and 6B. FIG. 8 is a longitudinal cross sectional view of a portion of the damper unit 124 illustrated in FIG. 7(b). FIG. 9 is a perspective view illustrating the state in which the coil spring 132 is mounted on the damper unit 124.

In the support member 208, a slit 304 extending in the axial direction is formed at eight positions in total at both ends of the hook 300. The presence of such a slit 304 causes part of the hook 300 to bend inward when the coil spring 132 is pushed into the support member 208 from below so as to be mounted thereon, thereby facilitating the upper end of the coil spring 132 and allowing it to clear the side 300b in order to reach the support surface 300a. Further, by reducing the curvature diameter of the upper end of the coil spring 132 disposed above the support surface 300a, it becomes possible to adhere the coil spring 132 to the body part 300c of the support member 208. As a result, the coil spring 132 will contact the support member 208 (300c) relatively tightly and be assuredly held.

The coil spring 132 is configured such that it does not interfere with the side 300b of the hook 300 of the support member 208. This point will hereinafter be described in detail.

Figure 10:
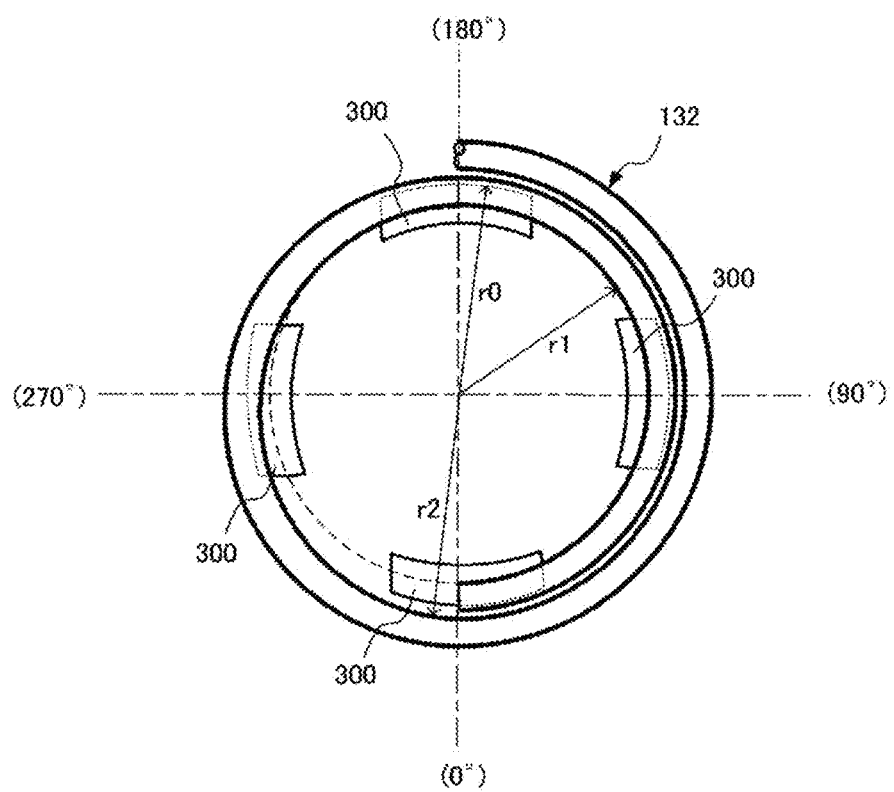
FIG. 10 is a plan view illustrating the characteristics of the present invention, schematically illustrating the positional relationship between the coil spring and a support hook, as viewed from the upper end direction of the coil spring.

FIG. 10 schematically illustrates the positional relationship between the coil spring 132 and the hook 300, as viewed from the upper end direction of the coil spring 132. Note that the flange 301 is actually present, with the illustration thereof omitted for convenience.

Within the range of 180 degrees from the upper tip, the coil spring 132 is molded so as to have a constant curvature radius r1 which is smaller than the radius r0 of the circle connecting the outermost edges of the hooks 300. In addition, it is supported on the support surface 300a of the hook 300 at least within the range (180 degrees). In the case of the present example, because the hook 300 is formed at four positions, the coil spring 132 is actually supported by three hooks 300.

The curvature radius of the coil spring 132 gradually increases after 180 degrees, wherein, at the point of reaching 360 degrees, the coil spring 132 is molded so as to have a curvature radius r2 which is larger than the radius r0 of the circle connecting the outermost edges of the hooks 300. Here, each of the curvature radii r1, r2 denotes the radius of the inside (side of the pin 126) of the bent coil spring 132, not the radius to the center of the thickness of the coil spring 132 having a constant thickness.

The coil spring 132 can be molded into a cylindrical shape so as to have a constant curvature radius r2 after the second winding from the upper end. Alternatively, it can have the outer shape of a conical shape as the curvature radius gradually increases after the second winding from the upper end.

Figure 11A:
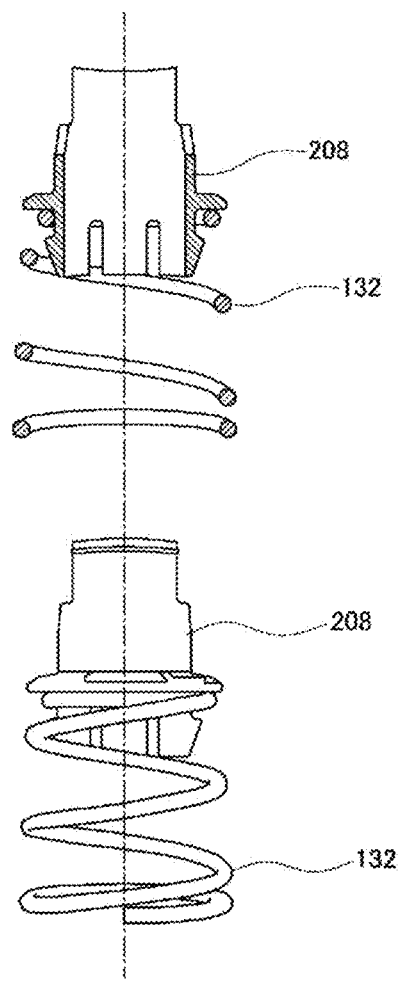
FIG. 11A is a cross sectional view and a perspective view illustrating a characteristic configuration (positional relationship between the coil spring and the support hook) of the present invention, illustrating the state of a predetermined reference position (0 degrees).
Figure 11B:
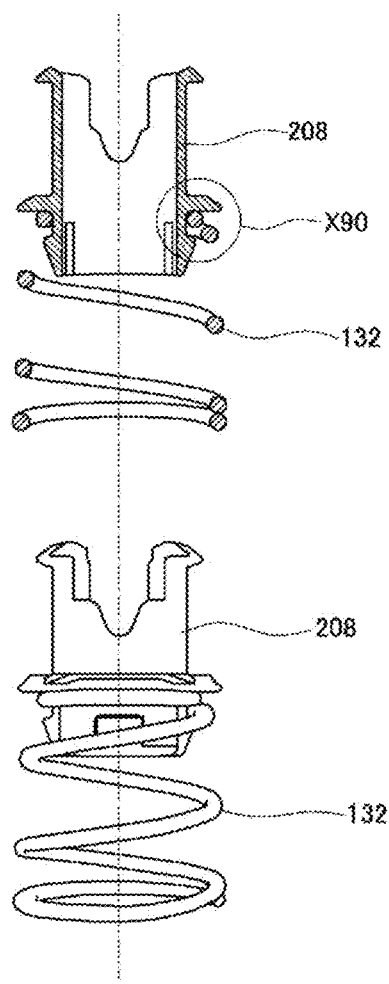
FIG. 11B is a cross sectional view and a perspective view illustrating a characteristic configuration (positional relationship between the coil spring and the support hook) of the present invention, illustrating the state rotated by 90 degrees from the reference position of FIG. 11A.
Figure 11C:
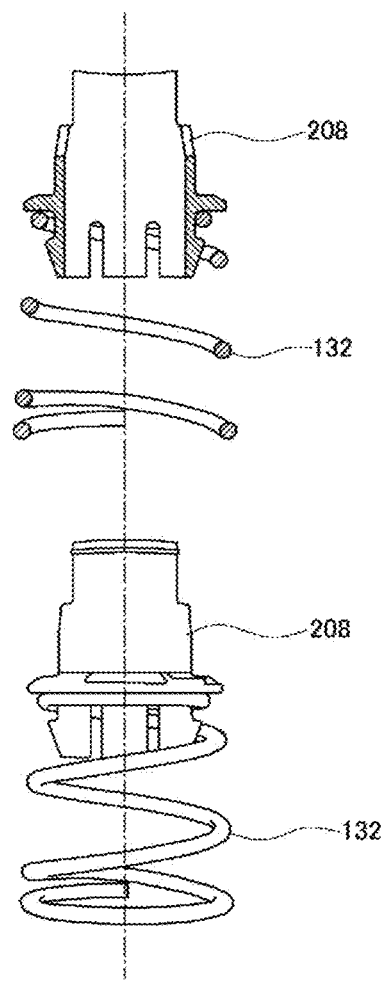
FIG. 11C is a cross sectional view and a perspective view illustrating a characteristic configuration (positional relationship between the coil spring and the support hook) of the present invention, illustrating the state rotated by 180 degrees from the reference position of FIG. 11A.
Figure 11D:
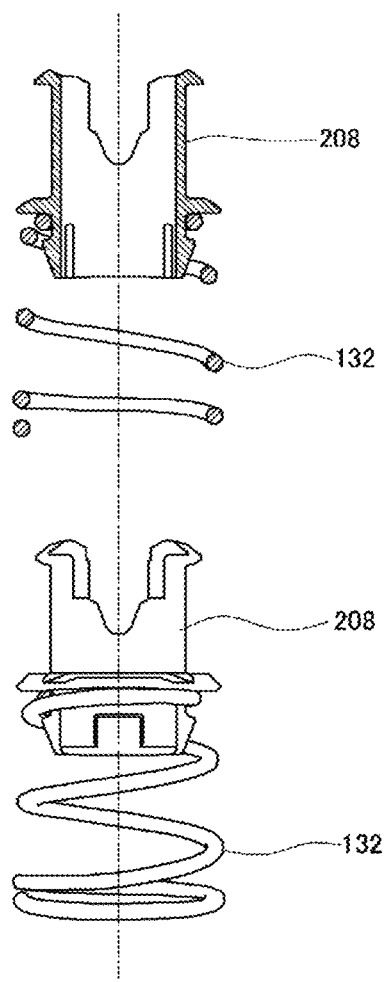
FIG. 11D is a cross sectional view and a perspective view illustrating a characteristic configuration (positional relationship between the coil spring and the support hook) of the present invention, illustrating the state rotated by 270 degrees from the reference position of FIG. 11A.
Figure 12:
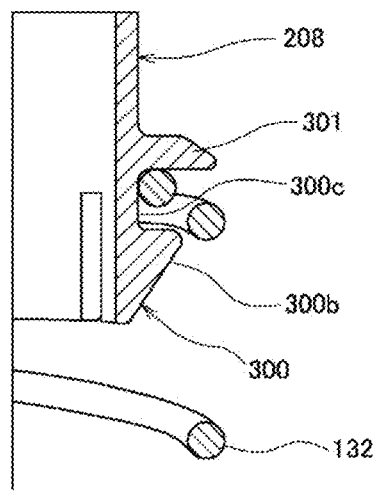
FIG. 12 is an enlarged cross sectional view of the part surrounded by X90 in FIG. 11B.

FIGS. 11A to 11D are cross sectional views and perspective views each illustrating a characteristic configuration (positional relationship between the coil spring 132 and the support hook 300) of the present invention, illustrating the state with each rotated by 90 degrees across B to D from the reference position of FIG. 11A. FIG. 12 is an enlarged cross sectional view of the part surrounded by X90 in FIG. 11B.

It is found that by devising the shape of the coil spring 132, the configuration of the support member 208, and the shape of the hook 300, the coil spring 132 does not interfere with the hook 300 after the second winding. As a result, the coil spring 132 can be prevented from tilting from the axial direction and being mounted on the support member 208.

Figure 13:
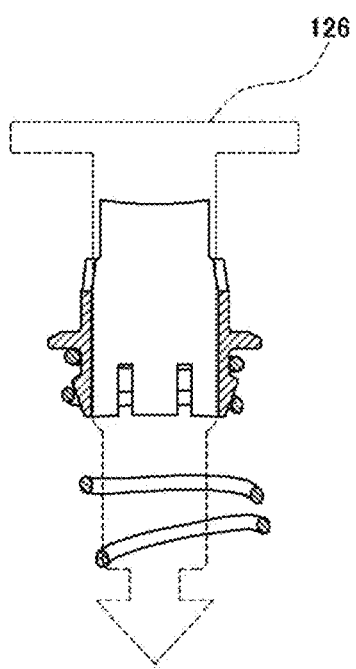
FIG. 13 is a cross sectional view used to describe the problems of the present invention.

If a novel technical device as in the present invention is not employed, as illustrated in FIG. 13, the coil spring 132 tilts in order to be mounted.

While examples of the present invention have been described thus far, the present invention is not limited by these examples and may be modified as long as it is included in the category of technical ideas described in the Scope of the Patent Claims.

The invention claimed is:

1. A steering wheel, comprising:
a cored bar member; and
an airbag module which houses an airbag cushion and an inflator and is coupled to the cored bar member via a coupling pin; the steering wheel employing a configuration in which the coupling pin extends from a side of the airbag module to a side of the cored bar member;
wherein:
a coil spring arranged outside the coupling pin; and
a support member supporting an upper end of the coil spring at a peripheral part of the coupling pin, the support member comprises a hook which includes:
a support surface protruding in a direction vertical to a shaft of the coupling pin in order to support the upper end of the coil spring; and
a side extending from the support surface towards a lower side of the coupling pin, and the coil spring is configured so as not to interfere with the side of the hook,
wherein the hook is provided at minimally four positions at equal intervals in a plane perpendicular to an axial direction of the coupling pin,
wherein within a predetermined range from the upper end, the coil spring is molded so as to have a constant curvature radius r1 which is smaller than a radius r0 of a circle connecting outermost edges of the hooks, in addition to being supported on the support surface of each of the hooks within at least the predetermined range, and
wherein a curvature radius gradually increases at a part exceeding the predetermined range, while, at the point of reaching 360 degrees, the coil spring has a curvature radius r2 which is larger than the radius r0 of the circle connecting the outermost edges of the hooks.

2. The steering wheel according to claim 1, wherein the predetermined range is 180 degrees.

3. The steering wheel according to claim 1, wherein the coil spring is molded so as to have a constant curvature radius r2 after a second winding from the upper end.

4. The steering wheel according to claim 1, wherein the coil spring has an outer shape of a conical shape or truncated conical shape as the curvature radius gradually increases after the second winding from the upper end.

5. The steering wheel according to claim 1, wherein the side of the hook tilts towards a center side of the support member as it moves to the lower side of the coupling pin.

6. An airbag module employed in the steering wheel according to claim 1.

7. A damper unit employed in the steering wheel according to claim 1.

8. The steering wheel according to claim 1, wherein a slit extending in an axial direction is formed in a vicinity of the hook in the support member.

9. The steering wheel according to claim 8, wherein the slit is formed at both ends of the hook in a circumferential direction of the support member.

\* \* \* \* \*